United States Patent
Fallin et al.

(10) Patent No.: US 7,113,093 B2
(45) Date of Patent: Sep. 26, 2006

(54) INTEGRATED ELECTRONIC ARTICLE SURVEILLANCE (EAS) AND POINT OF SALE (POS) SYSTEM AND METHOD

(75) Inventors: David B. Fallin, Coral Springs, FL (US); John J. Clark, Boynton Beach, FL (US); Scott A. Tribbey, Coconut Creek, FL (US); Robert K. Lynch, Coconut Creek, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 10/698,883

(22) Filed: Oct. 31, 2003

(65) Prior Publication Data

US 2004/0164863 A1 Aug. 26, 2004

Related U.S. Application Data

(60) Provisional application No. 60/449,481, filed on Feb. 21, 2003.

(51) Int. Cl.
G08B 13/14 (2006.01)

(52) U.S. Cl. .............. 340/572.1; 340/572.3; 340/540; 340/541; 340/568.1; 235/383; 235/375; 235/462.13

(58) Field of Classification Search ............ 340/572.1, 340/572.3, 540, 568.1, 825.54, 541; 235/383, 235/375, 462.13
See application file for complete search history.

(56) References Cited

U.S. PATENT DOCUMENTS

| 5,412,193 | A | | 5/1995 | Swartz et al. |
| 5,589,820 | A | * | 12/1996 | Robinson et al. ......... 340/572.3 |
| 5,745,036 | A | * | 4/1998 | Clare ....................... 340/572.1 |
| 5,979,758 | A | * | 11/1999 | Swartz et al. ................ 235/383 |
| 6,281,796 | B1 | | 8/2001 | Canipe et al. |
| 6,354,491 | B1 | | 3/2002 | Nichols et al. |
| 2002/0011933 | A1 | * | 1/2002 | Andersen et al. ......... 340/572.1 |
| 2004/0113791 | A1 | * | 6/2004 | Salim et al. ............. 340/572.3 |

* cited by examiner

Primary Examiner—Tai Nguyen
(74) Attorney, Agent, or Firm—Alan M. Weisberg; Christopher & Weisberg, P.A.

(57) ABSTRACT

A system and method for integrating point of sale (POS) data with electronic article surveillance (EAS) data, comprising a general-purpose computer for receiving and processing POS and EAS data is disclosed. The system and method preferable comprise reporting analyzed and collated data to a user.

30 Claims, 13 Drawing Sheets

FIG. 2
Prior Art

System Activity Log 200

Store #: _____
System #: _____  210
Coordinator #: _____

From #: _____
To #: _____

| Activity Information | | | | | Failure to Deactivate 230 | | | Recoveries 240 | | | |
|---|---|---|---|---|---|---|---|---|---|---|---|
| Indicator Number 212 | Date 214 | Time 216 | Entry By 218 | Activity Code 220 | Dept. 232 | Cashier ID & Location 234 | PR Code 236 | $ Val. 242 | Dept. 244 | Description 246 | Reference 248 |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

ACTIVITY CODES  220

TIA: Tag in the Area
TST: Test
FTD: Failure to Deactivate
RAW: Run-away
REC: Recoveries APP: Apprehension
UEA: Unexplained Alarm
OTH: Other (explain)
STM: Stock Movement

PR CODES  236

1. Pleasant
2. Understanding
3. Agitated
4. Hostile

Register / Aisle
Enter Number

[          ]

ENTER : Continue
BACK : Previous Screen
<* : Backspace

Pending Events: 1

Public Relations Code
Select A Code

[ PRCode1 -> ]
[ PRCode2 -> ]
[ PRCode3 -> ]
[ PRCode4 -> ]
[ PRCode5 -> ]

BACK : Previous Screen

Pending Events: 2

Cashier ID
Enter Number

[          ]

ENTER : Continue
BACK : Previous Screen
<* : Backspace

Pending Events: 0

Receipt ID
Enter Number

[          ]

ENTER : Continue
BACK : Previous Screen
<* : Backspace

Pending Events: 1

| Name | Type | Description |
|---|---|---|
| Sequence Number | Numeric | Auto-generated unique number used to identify the transaction |
| Store ID | Char | User-defined alphanumeric ID to identify the store |
| Event Type | Numeric | Types of Events:<br>1 – Acknowledged Alarm<br>2 – Unacknowledged Alarm<br>3 – EAS System On Line<br>4 – EAS System Off Line<br>5 – EAS System Problem |
| Operator ID | Numeric | User-defined numeric ID to identify the user |
| Cashier ID | Numeric | ID number of the cashier who processed the merchandise which caused the alarm |
| Time Stamp Occurred | Char | Date and time the alarm notification occurred or was received by the ALU. Format is MM/DD/YYYY HH:MM:SS |
| Time Stamp Acknowledged | Char | Date and time the alarm notification was acknowledged by the user. Format is MM/DD/YYYY HH:MM:SS |
| PR Code | Numeric | Public Relations Code |

| Name | Type | Description |
|---|---|---|
| Reason Code | Numeric | Numeric code for the reason for the alarm. Range is 1-16 |
| Reason Abbreviation | Char | Three character Reason Code abbreviation |
| Lane ID | Numeric | Register ID where the merchandise which caused the alarm was processed |
| Door ID | Numeric | User-defined numeric door ID |
| Door Description | Char | User-defined description for the entrance/exit |
| Response Time | Char | Elapsed number of minutes and seconds before the alarm was acknowledged |
| Receipt Barcode | Char | Barcode scanned from the customer's receipt |
| Item(s) UPC | Char | UPC of the product(s) that caused the alarm. This field is repeated for multiple items |
| Actual Alarm Count | Numeric | Actual number of times the EAS system alarmed for the event |

918 — Reason Code
920 — Reason Abbreviation
922 — Lane ID
924 — Door ID
926 — Door Description
928 — Response Time
930 — Receipt Barcode
932 — Item(s) UPC
934 — Actual Alarm Count

INTEGRATED ELECTRONIC ARTICLE SURVEILLANCE (EAS) AND POINT OF SALE (POS) SYSTEM AND METHOD

CROSS-REFERENCE TO RELATED APPLICATIONS

This application claims the benefit of U.S. Patent Application No. 60/449,481, filed Feb. 21, 2003, entitled INTEGRATED ELECTRONIC ARTICLE SURVEILLANCE (EAS) DETECTION/DEACTIVATION AND POINT OF SALE (POS) SYSTEM AND METHOD, the entire disclosure of which is hereby expressly incorporated by reference.

BACKGROUND OF THE INVENTION

The present invention relates to the collection, transporting, processing and reporting of information and, in particular, the collection, transporting, processing and reporting of EAS and POS information.

Upon initial installation of an EAS system, a purveyor of goods (i.e., articles or products), such as a wholesaler or retailer, typically realizes a significant return on investment ("ROI") in the reduction of shrinkage. In this context, "shrinkage" refers to the loss of goods through the unauthorized taking or shoplifting of such goods by customers as well as employees. For an EAS system to be effective, a purveyor's employees must respond to all EAS alarms. For example, retail organizations need to be able to identify which retail locations do and do not comply with its response policies. Currently, POS and EAS systems are divergent technologies with no way to combine data into a correlated event. As a stand-alone, an EAS system helps control non-employee related shrinkage. However, a majority of retailer's shrinkage is due to internal employee theft, which is not substantially addressed by the stand-alone EAS systems.

FIG. 1 illustrates a conventional POS system 100. The system 100 includes one or more combination scanner and deactivators 102, register units 104 and a POS controller 106 connected by a POS network 108. The combination scanner and deactivator 102 can scan a product bar code label and also deactivate a tag attached to the product or to the bar code label. Once the bar code label is scanned, bar code information is provided to the register unit 104 through a link 103. The register unit 104 does not receive any information upon deactivation of the tag. The register unit 104 may query the POS controller 106 to obtain pricing for the product associated with the bar code label. These devices may be connected with other equipment through an in-store network 110. The conventional POS system 100 can flag monetary cash register exceptions such as voided transactions, returns and overcharges, but cannot identify and track shrinkage where EAS tags on goods have been deactivated but are not scanned for payment.

Purveyors who do keep track of EAS alarms conventionally use manual, paper-based logs. A conventional paper log 200 is shown in FIG. 2. When an alarm event occurs by, e.g., a customer exiting the store through or near an EAS detector, an employee may inscribe information relating to the alarm event on the paper log 200. The information may include activity information 210, such as an indicator number 212, date 214, time 216, person who entered the information, 218 and/or an activity code 220, which explains in broad terms the reason for the alarm event. The information may also include a "failure to deactivate" section 230, which is used to record the department 232, cashier information 234 and/or a public relations ("PR") code 236. The PR code may explain the customer's reaction to the alarm event, for example whether the customer was pleasant, understanding, agitated or hostile. The paper log 200 may also record recovery data 240, such as dollar value ("$ Val.") 242, department ("Dept.") 244, description 246 of the product and/or reference information 248.

These logs have proven to be very inaccurate with no sure way for a purveyor, such as a retailer, to verify the correctness of the entries in the paper-based logs or cross-reference information from and to the logs. Also, it is very labor intensive, expensive and a waste of time to get these paper logs into an electronic form, and to do so for data that may not even be accurate due to human error or otherwise.

In addition to the above, more and more retailers are requiring manufacturer product source tagging. There is no known method for determining source tagging compliance other than through manual inspection of a purveyor's stock or inventory.

SUMMARY OF THE INVENTION

In accordance with one aspect of the present invention, a method for integrating point of sale (POS) data with electronic article surveillance (EAS) data is provided. In a preferred embodiment, a general-purpose computer is provided, which is operable to receive and process data. The general-purpose computer preferably receives POS data and EAS data. The general-purpose computer processes the POS data and the EAS data. The general-purpose computer preferably includes a vending database for storing vending data. In this preferred embodiment, the method preferably further comprises storing the POS data as a first portion of the vending data in the vending database. The EAS data may be stored as a second portion of the vending data in the vending database. Preferably, the method may comprise selecting a subset portion of the vending data, comprising selected data from the POS data and the EAS data in accordance with a predetermined selection criterion. The selected subset portion may be reported in a predetermined format to, for example, a reporting device. The selected subset portion may provide system health information. Preferably, the POS data comprises merchandise data. Similarly, the EAS data preferably comprises alarm event data.

In an alternative embodiment, the merchandise data is associated with an article of merchandise. In this embodiment, the method preferably further comprises electronically identifying the merchandise data associated with the article of merchandise and providing the merchandise data to the general purpose computer. This may include scanning the bar code associated with the article of merchandise in conjunction with a sale of the article of merchandise. Preferably, the method further comprises deactivating an EAS tag associated with the article of merchandise, wherein the POS data includes deactivation data based on deactivating the EAS tag. In yet another preferred embodiment, the method preferably comprises receiving an alarm event at an EAS device. In this embodiment, the alarm event corresponds to an activated EAS tag. The EAS data includes alarm information based upon the activated EAS tag.

In accordance with another aspect of the present invention, a security management method is provided. In a preferred embodiment the method comprises receiving an alarm at an EAS device, with a timer being initiated in response to receiving the alarm. The timer is stopped in response to input from a user. Alarm event information is obtained at the EAS device, wherein the alarm event information is based upon the alarm. The method preferably includes transmitting the alarm event information from the EAS device to a general purpose computer. Preferably, the alarm corresponds to an activated EAS tag associated with an article of merchandise. The timer may be used to identify the response time to the alarm. It may also be used to correlate video information with at least one of EAS data and POS data. The alarm event information preferably includes one or more of responder information, sales person identification, receipt identification, location identification, POS identification, product information, a public relations code and a reason code. The public relations code may be based on a user-defined public relations code. The reason code may be selected from the group comprising failure to deactivate, failure to remove, recovery, related to last alarm, runaway, stock movement, system test, tags in the area, unexplained, unattended, incoming item, other and at least one user-defined reason code. In another preferred embodiment, the EAS device includes a scanner. In this embodiment, the alarm event information preferably includes scanning a bar code of an article of merchandise associated with triggering the alarm. The method preferably includes scanning a receipt from a POS device to obtain merchandise information. In this embodiment, the method may include associating the merchandise information with the alarm event information.

In accordance with yet another aspect of the present invention, a system for integrating POS data and EAS data is provided. A preferred embodiment of the system includes a vending database and a general-purpose computer. The vending database preferably is operable to store the POS data and the EAS data. The general-purpose computer is in operative communication with the vending database. Furthermore, the general-purpose computer is operable to receive and process both POS and EAS data. In an alternate embodiment, POS data is stored as a POS portion of the vending data. In another embodiment, EAS data is stored as an EAS portion of vending data. Preferably, the POS data is stored as a POS portion of the vending data when EAS data is stored as the EAS portion. More preferably, the general-purpose computer is operable to select a subset portion of the vending data from the vending database in accordance with predetermined selection criteria. The subset portion includes data from both the POS portion and the EAS portion.

In yet another embodiment, the system further comprises a POS device capable of use in connection with sales. The POS device is operable to obtain product information about an article of merchandise. The POS device is preferably capable of deactivating an EAS tag associated with the article of merchandise. In this embodiment, the POS device may be operable to obtain EAS tag information upon deactivation of the EAS tag. The POS device is preferably operable to generate the POS data based on the product information and the EAS tag information.

In accordance with yet another embodiment, the system preferably comprises an EAS device that is operable to receive an alarm event that corresponds to an activated EAS tag. The EAS device is preferably operable to generate EAS data based upon the alarm event. In accordance with yet another embodiment, the system preferably comprises a detector for detecting a signal from the activated EAS tag and generating the alarm event. Preferably, the EAS device is operable to control the detector. The EAS device preferably includes an alarm-event logging unit ("ALU") having a security management program and a memory for storing the security management program. The security management program is operable to receive the alarm event, to obtain alarm event information, and to generate the EAS data, based upon the alarm event and the alarm event information.

The alarm event information may comprise at least one of responder information, salesperson identification, receipt identification, location identification, POS identification, product information, a public relations code and a reason code. The public relations code is preferably based on a user-defined public relations code identifier. The reason code may be selected from among the group of reasons, comprising failure to deactivate, failure to remove, recovery, related to last alarm, stock movement, system test, EAS tags in area, unexplained, unattended, incoming item, other and at least one user-defined reason code. The alarm-logging unit may also include a keypad for inputting the alarm event information. Alternatively, the alarm-logging unit includes a scanner for inputting the alarm event information.

Preferably, the security management program includes a user-programmable interface. In another example, the EAS device is connected to the general-purpose computer through a wireless network. Alternatively, the EAS device may connect to the general-purpose computer through a wired network. The system may further comprise a reporting module for providing EAS system diagnostics based on the EAS data.

In accordance with another aspect of the present invention, an ALU is provided. The ALU includes a processor, a memory and an input. The processor is operable to execute instructions of a security management program. The memory stores the security management program. The input is operable to receive an alarm event corresponding to an activated EAS tag. The security management program performs actions upon receipt of the alarm event by the input. Preferably, the actions include obtaining alarm event information and generating EAS data based upon the alarm event and the alarm information. More preferably, the actions include initiating a timer in response to receiving the alarm event. The timer is stopped in response to input from the user. Alternatively, the actions may further comprise transmitting alarm event information from the ALU to a general-purpose computer. The alarm event information may comprise at least one of responder information, salesperson identification, receipt identification, location identification, POS identification, product information, a public relations and a reason code. The public relations code may be based on a user-defined public relations code tag identifier. The reason code may be selected from the group comprising failure to deactivate, failure to remove, recovery, related to last alarm event, runaway, stock movement, system test, EAS tags in area, unexplained, unattended, incoming item, other and at least one user-defined reason code. In another alternative, the security management program is operable to associate purchase information from a POS device with the alarm event information.

In yet a further alternative, the ALU further comprises a keypad for inputting alarm event movement information. In another embodiment, the ALU comprises a scanner for inputting the alarm event information.

In another alternative, the ALU processor is operable to generate an alarm time stamp based upon the alarm event. The alarm time stamp may be used to correlate video information with at least one of EAS data and POS data.

BRIEF DESCRIPTION OF THE DRAWINGS

FIG. 2 illustrates a conventional paper-based system activity log for use in a retail establishment.

FIGS. 8A–8K illustrate a series of graphical user interface displays for collecting and handling EAS and POS information in accordance with aspects of the present invention.

FIGS. 9A–B illustrate a data record of alarm-related data for use in accordance with the present invention.

FIG. 10 illustrates an exception-based report including a table of alarm events and a video image of a selected alarm event.

DETAILED DESCRIPTION

Figure 1:
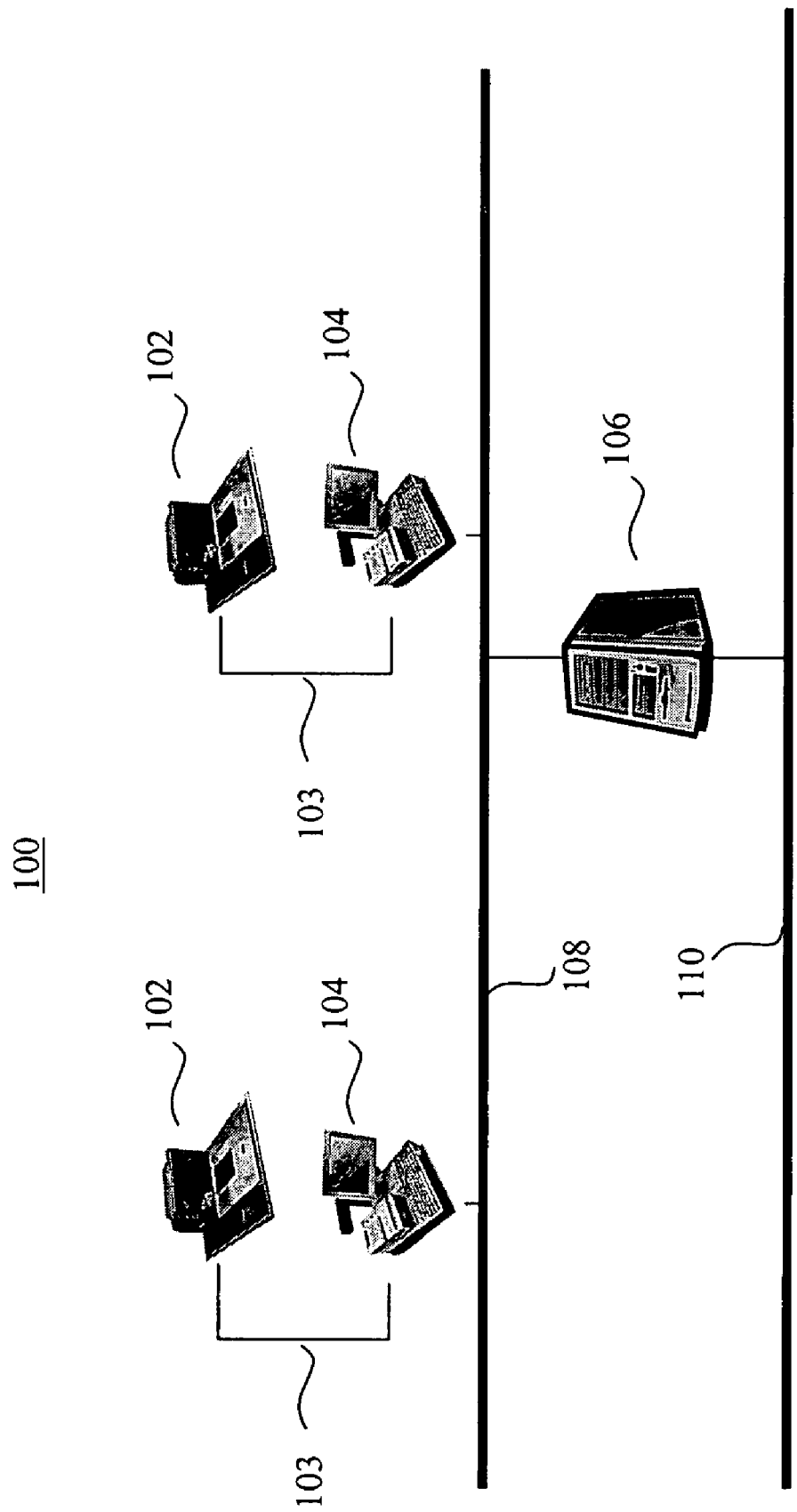
FIG. 1 illustrates a conventional POS system.

The foregoing aspects, features and advantages of the present invention will be further appreciated when considered with reference to the following description of preferred embodiments and accompanying drawings, wherein like reference numerals represent like elements. It is to be understood that certain steps or options may be performed in different order, and that the orders shown in various figures are merely preferred.

Figure 3:
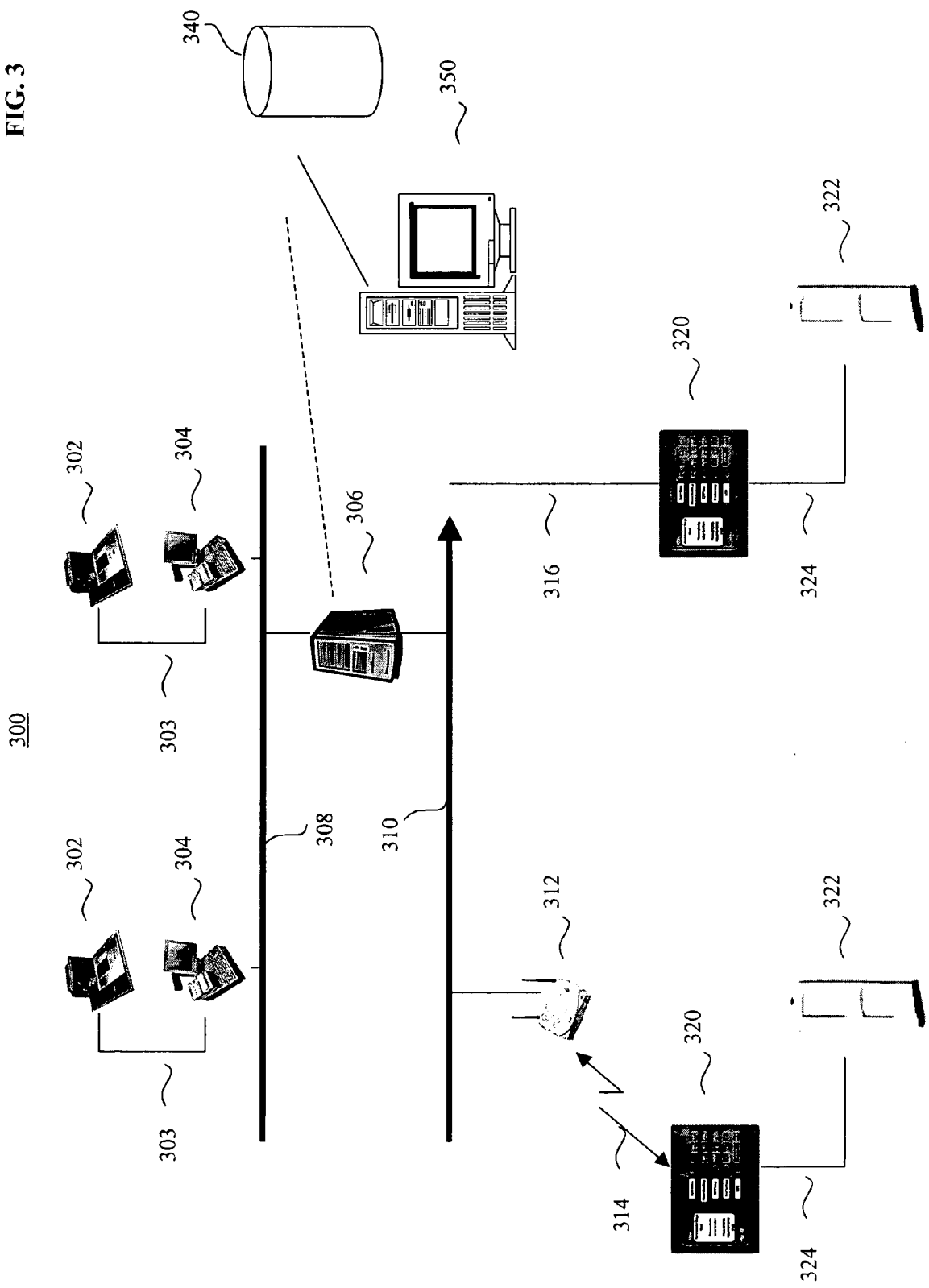
FIG. 3 illustrates an EAS and POS system in accordance with aspects of the present invention.

FIG. 3 illustrates a POS and EAS system 300, which comprises one or more combination scanner and deactivators 302 and register units 304. A POS controller 306 connects to the scanner/deactivators 302 and the register units 304 by a POS network 308. The scanner/deactivators 302 and the register units 304 preferably connect to each other via a link 303, which may be, for example, an RS-232 link. One or more alarm-logging units ("ALUs") 320 connect to the POS controller 306 through an in-store network 310. The in-store network 310 may include at least one wireless access point 312, which interacts with the ALU 320 through a wireless link 314. The in-store network 310 may also include a wired link 316 to the ALU 320, either alternative to or in combination with the wireless link 312. The wired link 316 preferably employs a TCP/IP communication protocol. The system 300 preferably also includes one or more EAS devices 322 connected to the ALU 320 by a link 324. The link 324 is preferably either an RS-232 link or a TCP/IP link. The EAS devices 322 may have, by way of example only, a floor mat configuration, an upright configuration or other suitable configuration that can identify an activated tag.

The POS controller 306 is preferably a general-purpose computer having all of the components commonly found in a personal computer. More preferably, the POS controller 306 is capable of supporting a window-based graphical user interface (GUI). The POS controller 306 preferably contains software and hardware for sending and receiving information over a variety of networks, comprising local area networks ("LANs") and wide area networks ("WANs"). The POS controller 306 may communicate using a modem or other communication components such as a network card, comprising a wireless LAN card. In an alternative, the POS controller 306 may be a conventional application server or any computer network server or other automated system capable of communicating with other computers over a network. The POS controller 306 may comprise one or more distributed processors.

The system preferably includes a vendor database 340, which may be integral with or linked to the POS controller 306 or may be part of a central reporting system 350 accessible through the in-store network 310. Although the invention is not limited to any particular database structure, the data maintained by the vendor database 340 may be stored as a table having a plurality of different fields and records. Alternatively, the data may also be stored using completely different methods of storing information such as XML or the like. The central reporting system 350 is preferably capable of performing data mining and reporting functions, and may communicate with other systems in other stores and/or in other locations.

Figure 4:
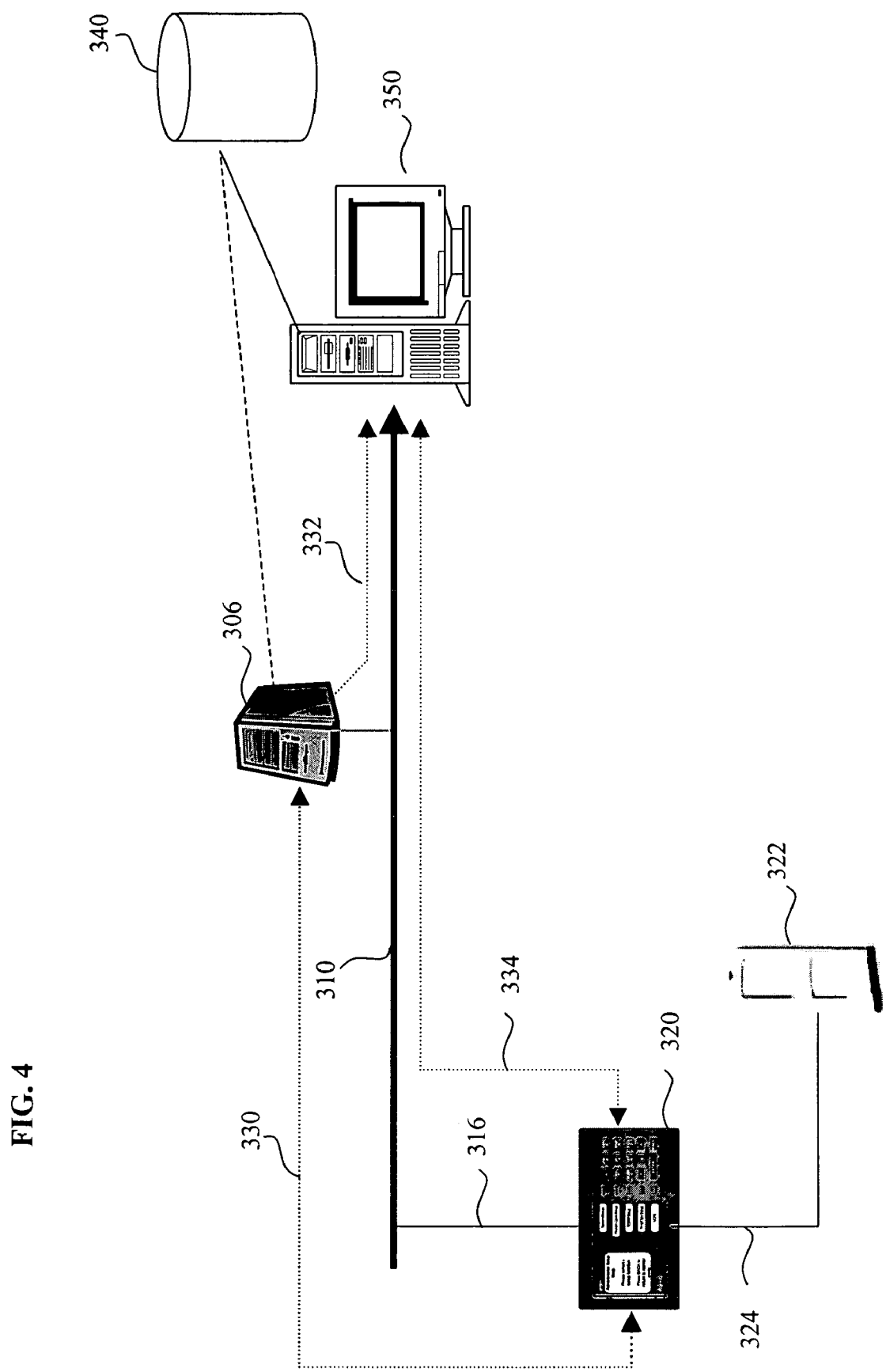
FIG. 4 illustrates a system flow diagram for data reporting in an EAS and POS system in accordance with aspects of the present invention.

The transaction flow of FIG. 4 represents a preferred example of alarm event reporting (exception reporting) for the system 300 of FIG. 3. Alarm transaction information may be communicated in different ways. For example, the ALU 320 and the POS controller 306 may send alarm transaction information between each other, as seen by the dotted communication line 330. In this case, the POS controller 306 can process and/or report out information to the central reporting system 350 as part of a transaction log, as seen by the dotted communication line 332.

In an alternative embodiment, the ALU 320 may interact directly with the central reporting system 350 by communicating alarm transaction information as seen by dotted communication line 334. As seen by the communication lines 332 and 334, alarm transactions may be "pushed" from the ALU 320 or "pulled" by the POS controller 306 or the central reporting system 340. For example, the ALU 320 may push data to either the POS controller 306 or the central reporting system 350 upon the occurrence of a triggering event, such as when a customer walks through the EAS device 322 with an activated tag, causing an alarm. Alternatively, the POS controller 306 or the central reporting system 350 may request, or pull, information from the ALU 320 based upon predetermined criteria.

Figure 5:
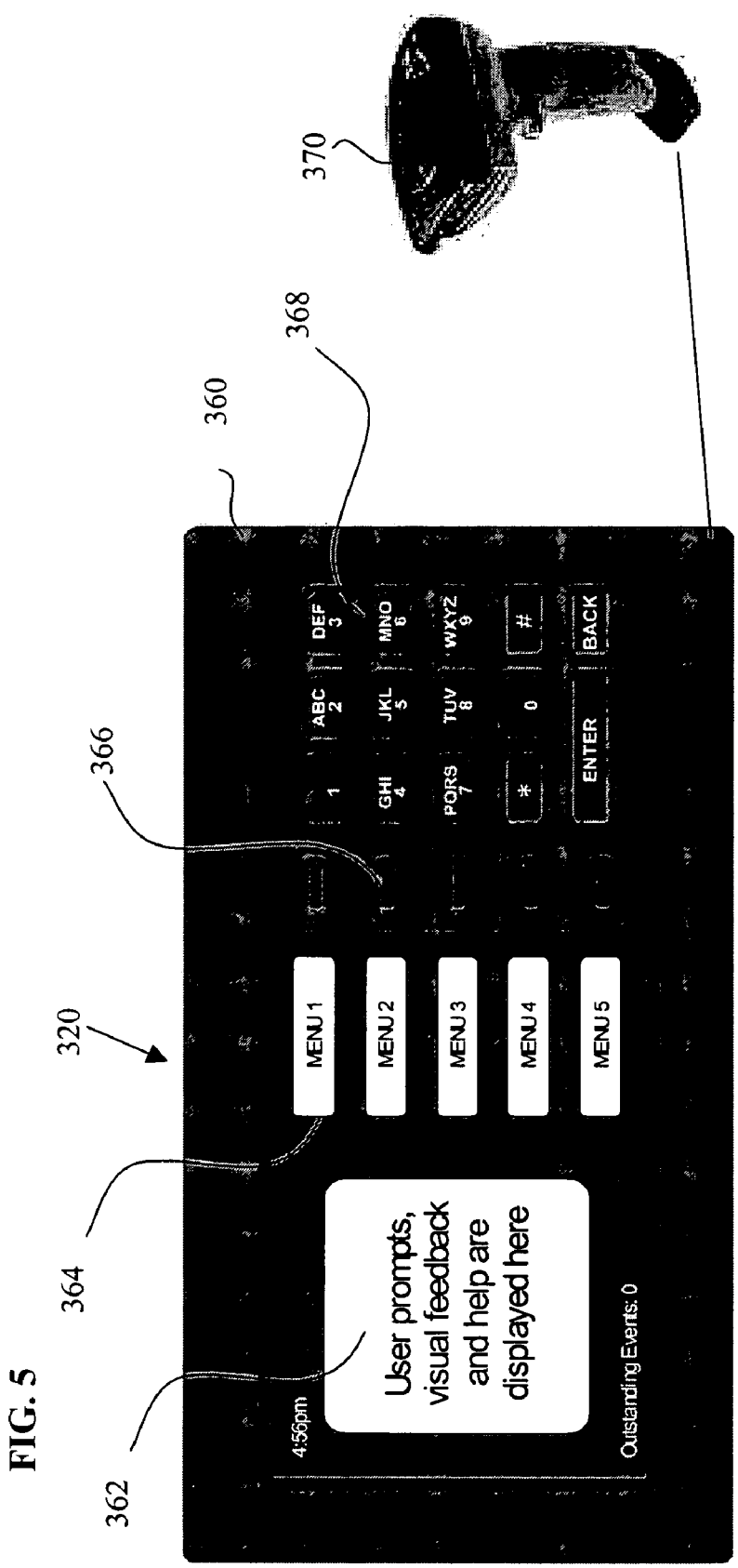
FIG. 5 illustrates an alarm-logging unit in accordance with aspects of the present invention.

FIG. 5 illustrates a preferred embodiment of the ALU 320 in more detail. In this embodiment, the ALU 320 includes hardware and software capable of responding to an EAS alarm and to record related data. The software may include a GUI, processing software and a communication module to handle communications with the EAS device 322, the POS controller 306 and/or the central reporting system 350. Direct communication from the ALU 320 to the EAS device 322 and the POS controller 306 allows for real time system health status. A retailer will likely be privy to the ALU protocols to configure and retrieve data from the ALU. The ALU 320 software functionality will be explained in more detail below in connection with FIGS. 6–7.

As shown in FIG. 5, the ALU 320 may include a housing 360, a display 362, one or more soft key prompts 364, one or more soft keys 366, a keypad 368 and/or a scanner 370. The housing 360 may be mounted adjacent to or remote from the EAS device 322. One advantage of mounting the housing 360 near the EAS device 322 is that a purveyor's employee may easily respond to an alarm at the EAS device 322.

The GUI may generate and display various informational screens on the display 362. By way of example only, the display 362 may be a liquid crystal ("LCD") display, light emitting diode ("LED") display, or the like. Preferably, the display 362 is a touch screen. For example, a user may select an option from one of the soft keys 366. Upon selection, soft key prompts 364 may provide various menu options for the user to choose from. The user may enter alarm event data into the ALU 320 by selecting appropriate soft keys 366 and/or soft key prompts 364. The user may enter data via the keypad 368, should one be provided. Similarly, if the scanner 370 is included as part of the ALU 320, the user may enter data by scanning a bar code label on an article of merchandise or off of a sales receipt. The scanner 370 may be connected to the housing 360 through any known means, comprising a wired or wireless link. The wireless link may utilize, for example, an 802.11 wireless LAN protocol or other suitable protocol.

In this manner, the ALU 320 can track, display and record employee response times to each alarm event, ensuring prompt attention and full compliance. The soft keys 366 and the soft key prompts 364 allow the purveyor to customize menu and feature options to allow efficient capturing of pertinent EAS and POS data. The ALU 320 features automated alarm responses, eliminating paper logs. The GUI is preferably an easy to follow Automated Teller Machine ("ATM")-style interface that allows simple keypad data entry. Thus, the ALU 320 is an advantageous tool that enables a purveyor, such as a retailer, to collect, manage, process and transmit EAS and POS data, which, in turn, helps to reduce shrinkage and to lower operating costs.

Figure 6:
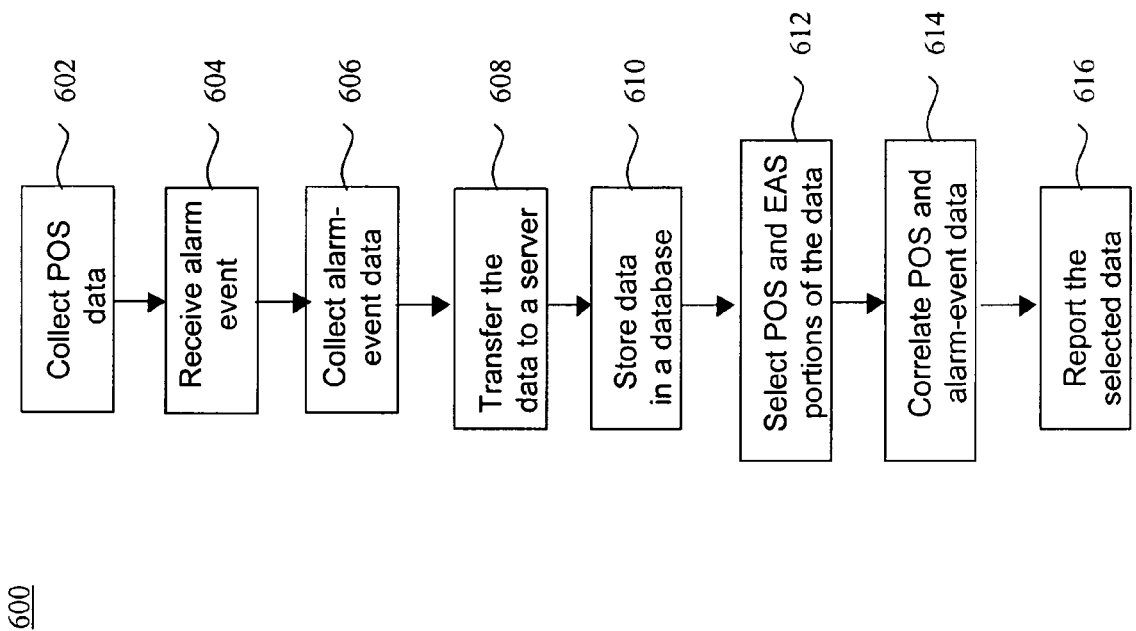
FIG. 6 illustrates a process flow diagram in accordance with aspects of the present invention.
Figure 7:
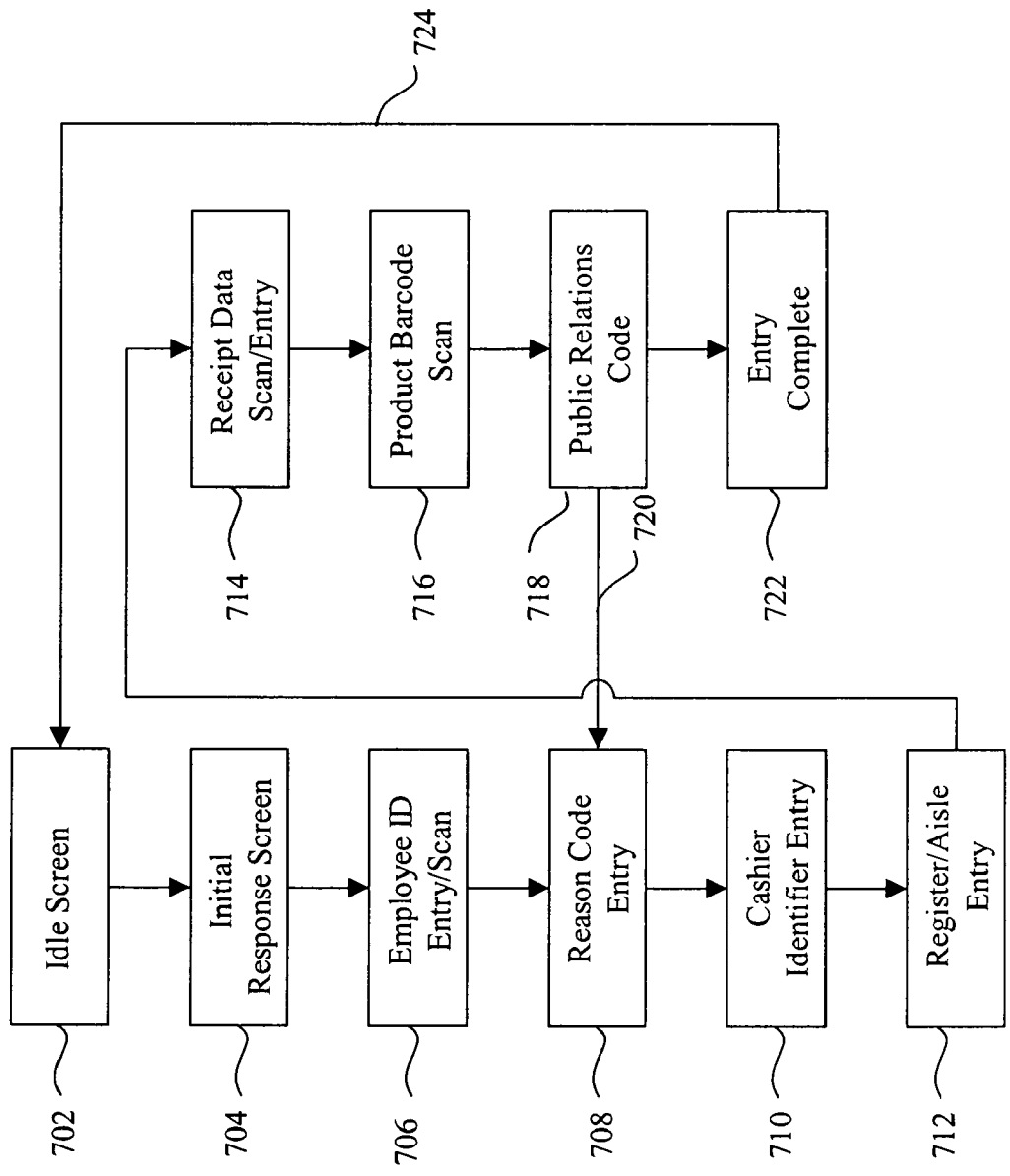
FIG. 7 illustrates an alarm response flowchart in accordance with aspects of the present invention.

FIG. 6 represents a flow diagram detailing an EAS/POS data process 600 in accordance with a preferred embodiment of the present invention. Step 602 of collecting POS data may be performed by the scanner/deactivator 302 and/or the register unit 304 (FIG. 3). POS collection may include, for example, a cashier or salesperson scanning a bar code label attached to an item and then processing payment for the item at the register unit 304. The scanner/deactivator 302 may simultaneously deactivate a product tag associated with the item being scanned. This deactivation step may be done separately as well. The ALU 320 may also be used to collect POS data by, for example, using the scanner 370 and/or the keypad 368 (FIG. 5). Thus, while the step 602 of collecting POS data is shown as an initial step, it should be understood that this and other steps in the process 600 might be executed in different order.

Continuing with the EAS/POS data process 600, step 604 of receiving an alarm event may occur, e.g., when the customer exits the store, triggering an alarm event at the EAS device 322. The ALU 320 preferably receives the alarm event from the EAS device 322. Then the ALU 320 performs the step of collecting alarm event data at step 606. This collection process is explained by the alarm response flow diagram 700 of FIG. 7 and GUI displays of FIGS. 8A–8K. Preferably, the GUI displays of FIGS. 8A–8K are flexible and user definable, depending on the information included in the alarm response flow diagram 700 and the preferences of the user.

Figure 8A:
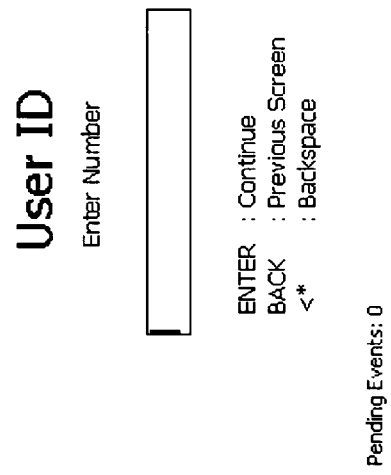
Figure 8B:
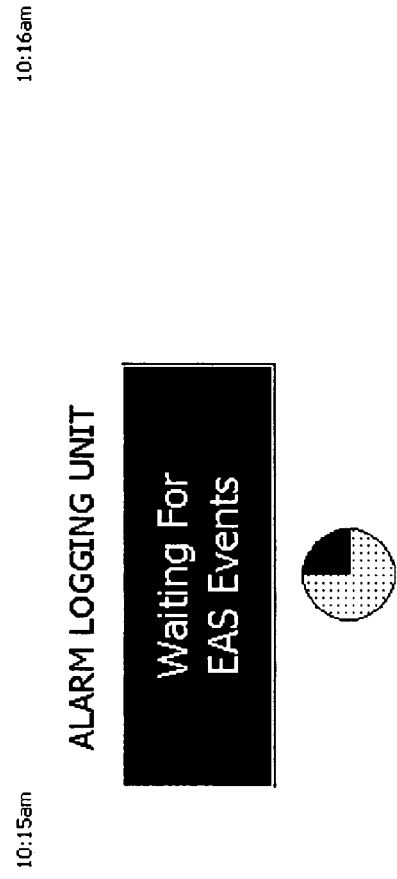
Figure 8C:
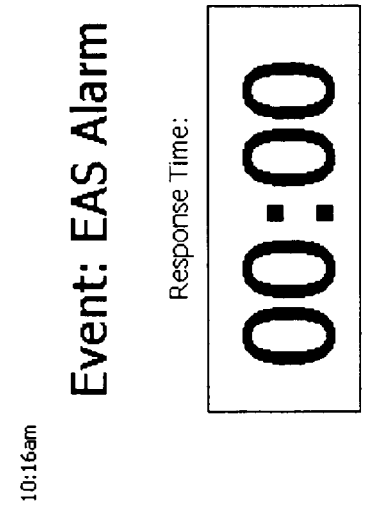

A preliminary or idle screen may be displayed as shown in step 702 prior to the occurrence of an alarm event (see FIG. 8A). Then, upon instruction of an alarm event, the ALU 320 may display an initial response screen as shown in step 704. The ALU 320 may initiate a response timer for calculating how long it takes a user to initially respond to the alarm, or to calculate the time to enter information and resolve the alarm event (see FIG. 8C). The user may be required to log into the ALU 320 by entering a pass code, identification number or other identifier, or by some other identification schemes (see FIG. 8B), as shown in step 706. In a preferred example, the ALU 320 may then terminate the response timer (see FIG. 8J) after the initial response or logging in by the user. Alternatively, the response timer may terminate after data entry is complete. Thus, the response timer can be used to train employees to improve response time, and, consequently, improve customer service. The alarm may be acknowledged, for example, by pressing a "soft key" on the keypad to get to the data entry portion of the alarm.

Figure 8D:
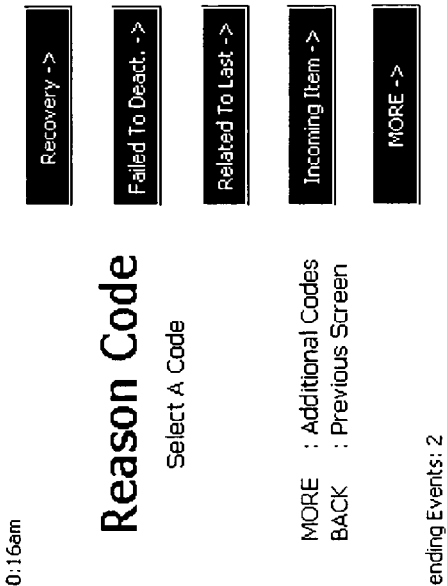
Figure 8J:
Figure 8I:
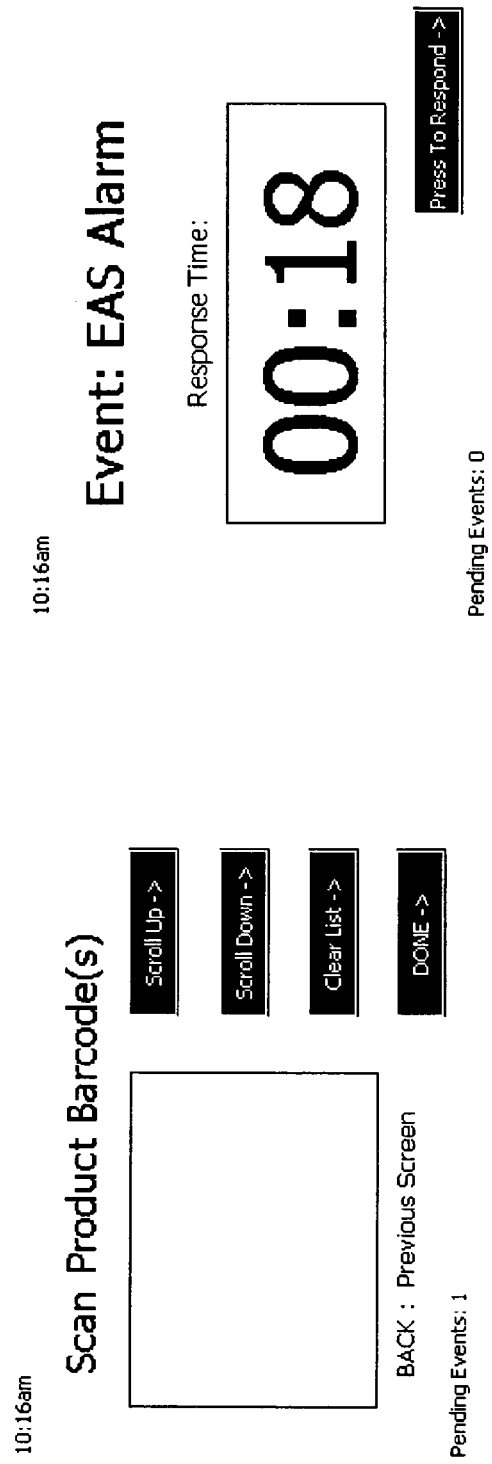
Figure 8K:

The user may enter a reason code in step 708 in order to identify the cause of the alarm event (see FIG. 8D). This information is useful in training sales associates, cashiers and other employees on how to handle merchandise tags, which in turn may increase operational efficiency and decrease costs. The reason code may be, for example, "failure to deactivate," "failure to remove," "recovery," "related to last alarm," "runaway," "stock movement," "tags in area," "system test," "unexplained," "unattended," "incoming item," "user-defined reason code" or "other."

A "failure to deactivate" reason code might be entered because, even though the customer paid for the merchandise, the tag was not properly placed on the merchandise, and thus the scanner/deactivator 302 did not deactivate the tag. The "failure to remove" reason code may be used when a purveyor uses an EAS hard tag, which is often used with clothing. This reason code indicates, for example, that the cashier forgot to remove the EAS hard tag when processing the sale. The "recovery" reason code might be entered in the situation where a customer has been stopped for stealing merchandise and the stolen items are recovered. The "related to last alarm" reason code relates to the prior alarm (usually the same person triggered the alarm more than once). For example, a person, standing near the EAS device 322 waiting for a store employee, may be triggering several alarms. As another example, an employee may request that the customer walk through the EAS device 322 again. The "runaway" reason code is usable in instances where, for example, a customer steals merchandise and runs out of the store through the EAS device 322 before being stopped. The "stock movement" reason code can be entered when stock (merchandise) is moved past the EAS device 322. For example, stock may be moved outside of the store for a sidewalk sale. The "tags in area" reason code may be entered when tags are found near the EAS device 322. For example, tags may be placed near the EAS device intentionally by a potential shoplifter, or a rack of clothes or other merchandise display is placed too close to the EAS device 322. The "system test" reason code can be used when the ALU 320 or other parts of the system 300 are undergoing testing, or when store employees are undergoing training. The "unexplained" reason code may be used when there is no identifiable explanation for the alarm event. The "unattended" reason code may be used when no employee was present to witness the alarm and cannot explain the reason for the alarm. The "incoming item" reason code may be used when a customer brings a non-deactivated tagged item into the store. "User-defined" reason codes may be tailored to the needs of a particular purveyor, and are easily implemented with the GUI, soft keys 366 and the soft key prompts 364 of the ALU 320. An "other" reason code may be used for any other reason.

After the reason code is entered, the user may enter a cashier identifier (see FIG. 8G) for a correlated/associated POS transaction, e.g., sale or return, as shown on step 710. Additional alarm event data may include the location of the merchandise, such as the aisle or register where the merchandise is displayed (see FIG. 8E). Such information is important to identify tag deactivator problems which cause tags to not be deactivated. This data may be entered as shown on step 712. The user may then enter receipt information (see FIG. 8H) with the keypad 368 or may use the scanner 370 to input the receipt information in step 714. The product barcode or other identifying information may be entered in step 716 using the scanner 370 or other means (see FIG. 8I). The user may enter additional data. For example, the user may enter a "public relations" code at step 718 in order to identify the customer's response to the alarm event (see FIG. 8F). The "public relations" code may state that the customer was pleasant, understanding, agitated or hostile in response to the alarm event and subsequent actions by the employee. Alternatively, the public relations code may be based on a user-defined identifier selected or created depending on the purveyor's needs, or may be based on other criteria, such as a reporting standard or marketing requirement. Like the reason codes, the public relations code is useful in training sales associates, cashiers and other employees on how to handle customers in alarm event situations.

If a new alarm event occurs during data entry in steps 708–718, the user may return to step 708 via branch 720 in order to enter pertinent information for this new alarm event. Thus, the system 300 is capable of handling multiple alarm events seamlessly. Alternatively, if data entry is complete at step 722 (see FIG. 8K), the routine 700 may return to the idle screen of step 702 by branch 724.

As in process 600 (FIG. 6) and other processes of the present invention, the steps of the alarm response flow diagram 700 may be performed in different order. In alternative embodiments, one or more steps in the alarm response flow diagram 700 may be omitted. By way of example only, a modified flow may only include the idle screen of step 702, the initial response screen of step 704, the reason code entry of step 708 and the entry complete of step 722.

Returning to FIG. 6, the alarm event data and the POS data are transferred to either the POS controller 306 or the central reporting system 350, as shown by step 608. As indicated with regard to FIG. 4, the ALU 320 may either push or have pulled the relevant information to the POS controller 306 or the central reporting system 350. Then in step 610, the data is stored as an alarm data record in the vendor database 340.

FIGS. 9A and 9B illustrate an example of an alarm data record 900 containing alarm event data. The data may be stored as numeric and/or character information. The numeric and character storage types shown in FIGS. 9A and 9B are preferred ways of storing the data shown. The alarm event data preferably includes a numeric sequence number 902 to uniquely identify the alarm event. A store ID 904 may be a character-based identifier. An event type 906 may be numerical identifier representing the type of event. By way of example only, the event may be one of an acknowledged alarm (1), an unacknowledged alarm (2), EAS system on line (3), EAS system off line (4) or EAS system problem (5). The operator ID 908 is a numeric identifier for the user who responded to the alarm. A cashier ID 910 may be a numeric identifier to record the identity of the cashier or salesperson who processed (e.g., sold) the merchandise which triggered the alarm. The time stamp occurred field 912 may be used to identify the date and time the alarm notification occurred or was received by the ALU. The occurred time may be in MM/DD/YYYY HH:MM:SS format. The time stamp acknowledged field 914 may be used to identify the date and time the alarm notification was acknowledged by the user. The acknowledged time may be in MM/DD/YYYY HH:MM:SS format. A public relations (PR) code 916 and a reason code 918 may be numerical identifiers representing the various options discussed earlier. Preferably, the reason code 918 has a numeric value from 1 to 16. A reason abbreviation 920 is preferably a 3-character reason code abbreviation. Similarly, numerical identifiers may also represent a lane ID 922. A door ID 924 and a door description 926 may be used to identify the location of the EAS device 322. The door ID 924 is preferably a user-defined numeric door ID. The door description 926 is preferably a character-based user-defined description for the entrance/exit. The response time 928 identifies the elapsed time (e.g., minutes and seconds) before the alarm is acknowledged. Receipt bar codes 930 and UPC product code(s) 930 may be stored as alphanumeric data. Also, an actual alarm count 932 is preferably a numeric record identifying the actual number of times the EAS system has recorded an alarm for a given event.

Returning to FIG. 6, in a subsequent step, 612, POS and EAS portions of the data are selected from the vendor database 340. Such selection may be performed by an application associated with either the POS controller 306 or the central reporting system 350. In a preferred example, the application resides at the central reporting system 350. Alternatively, the application may reside locally on the POS controller 306. The selected POS and EAS portions may then be correlated as shown by step 614. Correlation brings selected POS and EAS information together. For example, POS information about a deactivated tag may be coupled with a subsequent alarm event to identify issues such as deactivator hardware problems. Thus, if a deactivator at a particular register is malfunctioning, correlation may identify which deactivator to repair. Correlation can also identify cashier training issues, wherein a cashier may not know how to properly deactivate products. Double tagging can also be identified, as well as improper placement of tags. Furthermore employee theft can be identified and rectified. On form of employee theft addressed by the present invention is "sweet hearting" wherein a more expensive product is deactivated while a less expensive product is scanned. Correlation of the data enables the user to identify whether a cashier is engaging in sweet hearting, and thus can prevent significant losses of merchandise. Also, at this point, the correlated information can be leveraged to allow a purveyor to perform data mining to extract all relevant information associated with an EAS event. For example, the process 600 allows reporting of selected, correlated data in step 616.

Figure 10:
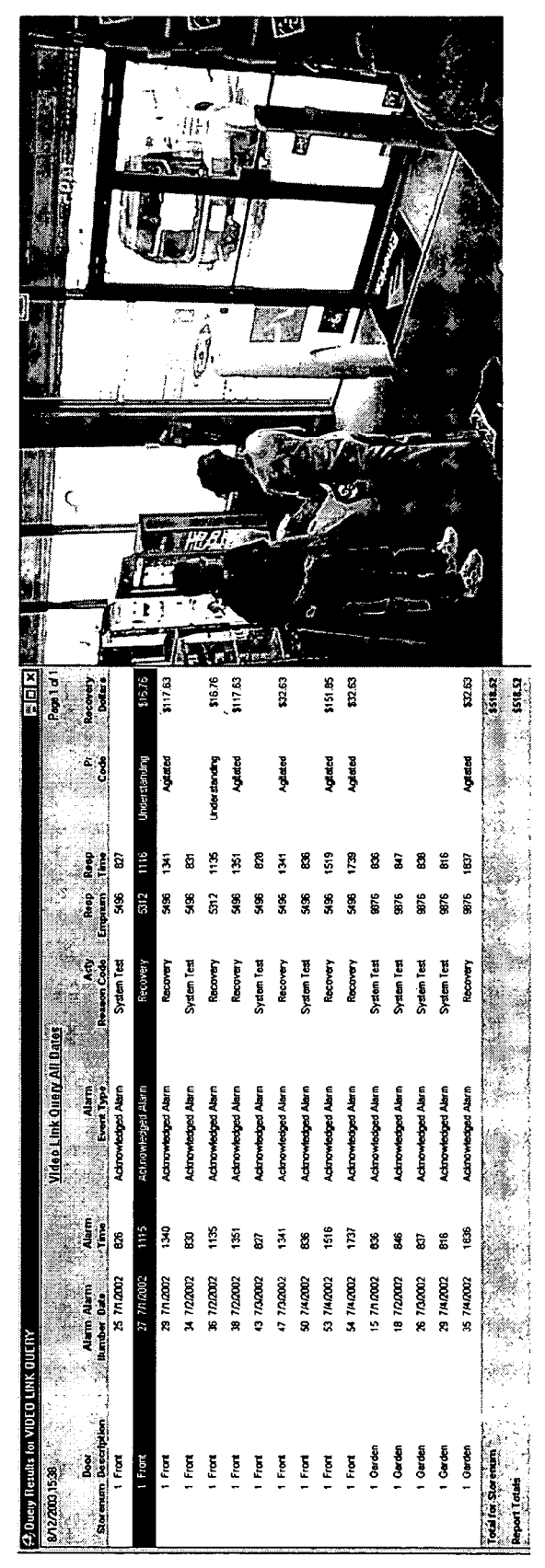

A reporting module can be used to report the correlated data. Preferably, the reporting module resides at the central reporting system 350, although it may be located elsewhere. The reporting module brings exception-based reporting to an EAS system. The reporting module allows users to quickly and easily generate detailed reports and graphs that focus on alarm trends and particular problem areas. It also offers users alerts and email reporting, as well as providing overall EAS system diagnostics (e.g., system health information). The system of the present invention is flexible enough to work with off-the-shelf reporting modules or to integrate with any other in-store reporting solution, including customized reporting solutions. Thus, the system allows a user to monitor EAS alarms and find behaviors that may indicate thefts, inadequate response to alarms, cashier training issues, deactivator hardware issues or improper tagging at all levels throughout the company. A user will be able to ensure that the POS and EAS system 300 is used correctly and performs to its fullest potential. The reporting module may join the alarm data files with additional data to provide meaningful trend analysis based upon store, responding employee, sales associate/cashier, alarm transaction specifics (e.g., reason codes or public relations codes), maintenance reporting and/or alerts. Reports and graphs can be easily generated to summarize alarm-related activities. Video and/or still image data may be incorporated in such presentation materials. In one option, the time stamp is used to correlate the video information with other data, e.g. EAS and/or POS data. FIG. 10 illustrates an exception-based report 1000 incorporating tabular and video information together. Such reporting allows purveyors to maximize efficiency and lower operational costs by, for example, reducing shrinkage by customers and/or employees.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for integrating point of sale (POS) data with electronic article surveillance (EAS) data, comprising:
    providing a general purpose computer operable to receive and process data;
    receiving POS data at the general purpose computer;
    receiving an alarm event at an EAS device, the alarm event corresponding to an activated EAS tag;
    obtaining alarm event information inputted into an alarm event logging unit by an user;
    generating EAS data based upon the alarm event and the inputted alarm event information;
    receiving the EAS data at the general purpose computer; and
    processing the POS data with the EAS data at the general purpose computer.

2. The method of claim 1, wherein the general-purpose computer includes a vending database for storing vending data and the method further comprises storing the POS data as a first portion of the vending data in the vending database.

3. The method of claim 2, further comprising storing the EAS data as a second portion of the vending data in the vending database.

4. The method of claim 3, further comprising selecting a subset portion of the vending data comprising selected data from the POS data and the EAS data in accordance with a predetermined selection criterion.

5. The method of claim 4, further comprising reporting the selected subset portion of the vending data in a predetermined format.

6. The method of claim 5, wherein the selected subset portion of the vending data is reported to a reporting device, and the selected subset portion provides system health information.

7. The method of claim 1, wherein the POS data comprises merchandise data.

8. The method of claim 7, wherein the merchandise data is associated with an article of merchandise, and the method further comprises:
    electronically identifying the merchandise data associated with the article of merchandise; and
    providing the merchandise data to the general purpose computer.

9. The method of claim 8, wherein electronically identifying the merchandise data includes scanning the article of merchandise in conjunction with a sale of the article of merchandise.

10. The method of claim 9, further comprising deactivating an EAS tag associated with the article of merchandise, wherein the POS data includes deactivation data based on deactivating the EAS tag.

11. A system for integrating point of sale (POS) data and electronic article surveillance (EAS) data, the system comprising:
    a vending database operable to store the POS data and the EAS data;
    a general purpose computer in operative communication with the vending database, the general purpose computer being operable to receive and process the POS data and the EAS data;
    an EAS device operable to receive an alarm event corresponding to an activated EAS tag, the EAS device including an alarm event logging unit (ALU) having a security management program and a memory for storing the security management program, wherein
    the security management program is operable
        to receive the alarm event,
        to obtain alarm event information inputted by an user into the ALU, and
        to generate the EAS data based upon the alarm event and the alarm event information.

12. The system of claim 11, wherein the POS data is stored as a POS portion of vending data.

13. The system of claim 11, wherein the EAS data is stored as an EAS portion of vending data.

14. The system of claim 13, wherein the POS data is stored as a POS portion of the vending data.

15. The system of claim 14, wherein the general purpose computer is operable to select a subset portion of the vending data from the vending database in accordance with a predetermined selection criterion, the subset portion comprising data from the POS portion and the EAS portion.

16. The system of claim 11, further comprising a POS device capable of use in connection with sales, the POS device being operable to obtain product information about an article of merchandise.

17. The system of claim 16, wherein the POS device is further operable to deactivate an EAS tag associated with the article of merchandise.

18. The system of claim 17, wherein the POS device is further operable to obtain EAS tag information upon deactivation of the EAS tag.

19. The system of claim 18, wherein the POS device is further operable to generate the POS data, based on the product information and the EAS tag information.

20. The system of claim 11, further comprising a detector for detecting a signal from the activated EAS tag and generating the alarm event.

21. The system of claim 20, wherein the EAS device is operable to control the detector.

22. The system of claim 11, wherein the alarm event information comprises at least one of responder information, salesperson identification, receipt identification, location identification, POS identification, product information, a public relations code and a reason code.

23. The system of claim 22, wherein the public relations code is based on a user-defined public relations code identifier.

24. The system of claim 22, wherein the reason code is selected from the group of reasons comprising failure to deactivate, failure to remove, recovery, related to last alarm, runaway, stock movement, system test, EAS tags in area, unexplained, unattended, incoming item, other, and at least one user-defined reason code.

25. The system of claim 11, wherein the ALU further comprises a keypad for inputting the alarm event information.

26. The system of claim 11, wherein the ALU further comprises a scanner for inputting the alarm event information.

27. The system of claim 11, wherein the security management program comprises a user-programmable interface.

28. The system of claim 11, wherein the EAS device is connected to the general purpose computer through a wireless network.

29. The system of claim 11, wherein the EAS device is connected to the general purpose computer through a wired network.

30. The system of claim 11, further comprising a reporting module operable to provide EAS system diagnostics based on the EAS data.

* * * * *